(12) United States Patent
Madsen et al.

(10) Patent No.: US 8,155,870 B2
(45) Date of Patent: Apr. 10, 2012

(54) METHOD OF NAVIGATING AN AGRICULTURAL VEHICLE, AND AN AGRICULTURAL VEHICLE IMPLEMENTING THE SAME

(75) Inventors: Tommy Ertbolle Madsen, Virum (DK); Rufus Blas Morten, Copenhagen (DK)

(73) Assignee: AGROCOM GmbH & Co. Agrarsystem KG, Bielefeld (DE)

( * ) Notice: Subject to any disclaimer, the term of this patent is extended or adjusted under 35 U.S.C. 154(b) by 463 days.

(21) Appl. No.: 12/485,323

(22) Filed: Jun. 16, 2009

(65) Prior Publication Data

US 2009/0319170 A1    Dec. 24, 2009

(30) Foreign Application Priority Data

Jun. 20, 2008    (EP) .................................... 08158693

(51) Int. Cl.
*G01C 21/00*    (2006.01)
*G06F 19/00*    (2006.01)

(52) U.S. Cl. ......... 701/200; 701/209; 701/213; 382/154

(58) Field of Classification Search .................. 701/200, 701/209, 213, 50, 30, 1; 382/154, 159
See application file for complete search history.

(56) References Cited

U.S. PATENT DOCUMENTS

| | | | |
|---|---|---|---|
| 5,974,348 A * | 10/1999 | Rocks | 701/28 |
| 2004/0221790 A1 | 11/2004 | Sinclair et al. | |
| 2006/0088203 A1 * | 4/2006 | Boca et al. | 382/153 |
| 2007/0288141 A1 * | 12/2007 | Bergen et al. | 701/38 |
| 2008/0144925 A1 * | 6/2008 | Zhu et al. | 382/154 |
| 2008/0193010 A1 * | 8/2008 | Eaton et al. | 382/159 |
| 2009/0326820 A1 * | 12/2009 | Shimizu | 701/301 |

FOREIGN PATENT DOCUMENTS

WO    2007/031093    3/2007

* cited by examiner

*Primary Examiner* — Tan Q Nguyen
(74) *Attorney, Agent, or Firm* — Michael J. Striker

(57) ABSTRACT

A method of navigating an agricultural vehicle, which is equipped with a 3D imaging device for imaging surroundings of the vehicle, and an image processing device, includes obtaining from the 3D imaging device frames imaging at least a part of the surroundings of the vehicle at different points of time while the vehicle is moving thus providing a chronological sequence of frames, analysing the frames, and establishing a change of pose of the vehicle using results of the analysis of at least two chronologically different frames.

19 Claims, 4 Drawing Sheets

METHOD OF NAVIGATING AN AGRICULTURAL VEHICLE, AND AN AGRICULTURAL VEHICLE IMPLEMENTING THE SAME

CROSS-REFERENCE TO RELATED APPLICATION

The invention described and claimed hereinbelow is also described in European Patent Application EP 08 158 693.5 filed on Jun. 20, 2008. This European Patent Application, whose subject matter is incorporated here by reference, provides the basis for a chain of priority of invention under 35 U.S.C. 119(a)-(d).

BACKGROUND OF THE INVENTION

The present invention relates to a method of navigating an agricultural vehicle, said vehicle being equipped with a 3D imaging device for imaging surroundings of the vehicle, and an image processing device.

Within agriculture it is a wish to be able to measure or establish the speed, the position, the heading etc. of a vehicle in order to be able to navigate the vehicle and any implement attached thereto in an agricultural field.

Methods and devices currently used in navigating agricultural vehicles comprise:

Wheel odometry, which uses encoders to measure how many revolutions the wheels have turned. Wheel odometry is sensitive to tire pressure and wheel slip. Wheel odometry does not give an absolute position and it drifts over time. The turn angles for the vehicle are hard to measure exactly due to tire slip of the steering wheels.

Radar, which can be used for velocity estimates, and which does not suffer from problems of wheel slip. It is however less accurate due to the physical ways it measures signals. Radar is therefore not very usable for accurate positioning.

Global positioning system (GPS), which depending on the type of sensor used (ranging from cheap low accuracy to expensive high accuracy systems) can give a full 3D position estimate. One drawback of the GPS system is that it requires an unobstructed view to the GPS satellites. Typically this cannot always be guaranteed meaning the system has a tendency to fail at times. There are many sources of errors in GPS including multi-path errors and atmospheric effects. Typical situations for agricultural use where GPS does not work very well includes: near structures or trees (e.g. in the headland of a field), and on hilly terrain.

Inertial navigation systems (INS) comprising an Inertial measuring unit (IMU) with 3 accelerometers and 3 gyros that measure accelerations and turn rates on all three spatial axes (6 degrees of freedom).

The most accurate systems commercially available comprise GPS and IMU sensors for positioning. These are commonly referred to as GPS aided inertial navigation systems (INS). The problem with a system of this kind is that position estimates quickly drift if the GPS signal is lost. Also it has a long settling time before it runs stable.

US 2004/0221790 A1 discloses a method and an apparatus for optical odometry, which may be implemented e.g. in a farm vehicle, such as a tractor, in a shopping cart or in an automotive anti-locking braking system. The apparatus comprises an electronic imager such as a monocular camera, which is directed vertically downwards to image the ground below the vehicle, which thereby works in the same way as an optical computer mouse. Combination with GPS is suggested.

US 2007/0288141 A1 discloses a method for visual odometry using in one embodiment a stereo camera. The method is suggested to be implemented in an object requiring navigation such as an autonomous (e.g. unmanned) vehicle or in a robot. Navigation in difficult or dangerous terrain without putting human operators at risk is mentioned. The fields of use envisaged in this publication are thus remote from agriculture. It is suggested to supplement the method of visual odometry with data from other sensors, such as GPS, inertial or mechanical sensors. According to the method a sequence of image frames are received and analysed to establish a change of pose and thus a new pose of the camera providing the image frames. According to the method feature points are found in a first image frame and they are then tracked in subsequent image frames e.g. for as long as they are in the field of view. Based on the sequence of image frames incremental pose estimates are established iteratively. When a criterion is fulfilled the iteration is stopped and a firewall is inserted whereby future triangulations of 3D points will not be performed using observations that precede the most resent firewall. Thus this method so to speak starts from a firewall and calculates forward a change of pose until a new firewall. Thus valuable information about change of pose immediately prior to the most resent firewall is lost for future estimates. This is adversely to the accuracy of the method and the reliability of its results.

WO 2007/031093 A1 discloses an agricultural vehicle equipped with a 3D imaging device imaging a part of the ground surrounding the vehicle in front of it. The 3D imaging device is used for tracking a swath on the ground with a view of picking up the swath by means of a baler.

SUMMARY OF THE INVENTION

The object of the present invention is to provide a method of navigating an agricultural vehicle that will enhance the precision of such navigation.

In accordance with the invention said method comprises: obtaining from the 3D imaging device frames imaging at least a part of the surroundings of the vehicle at different points of time while the vehicle is moving thus providing a chronological sequence of frames, analysing the frames, and establishing a change of pose of the vehicle using results of the analysis of at least two chronologically different frames. Using frames (or images or pictures) obtained from the 3D imaging device provides for high accuracy, which again provides for precise navigation.

Establishing a change of pose of a vehicle on basis of frames imaging the surroundings of the vehicle at different points of time is generally referred to as "visual odometry".

As used herein "pose" means position and attitude (or orientation). Thus the position of a body is changed by translation, while the attitude or orientation of the body is changed by rotation.

The 3D imaging device may be one of a variety of known devices including: stereo cameras, devices based on time-of-flight principle, etc. In case of a stereo camera comprising a left objective lens and a right objective lens it should be understood that one frame comprises a right frame and a left frame provided by the left objective lens and the right objective lens, respectively.

The vehicle is preferably equipped with at least one further navigation sensor and response from said at least one further navigation sensor is preferably used when establishing the change of pose. The combination of sensors enhances the precision of the method.

The at least one further navigation sensor is preferably selected from a group comprising a GPS sensor, an inertial measuring unit (IMU), a steering angle gauge indicating the angle of steering wheels of the agricultural vehicle and a wheel revolution indicator.

Visual odometry according to the present invention provides 3D position and rotation increments with high accuracy (6 degrees of freedom). This is in some way similar to the provision of an IMU. Where an IMU measures accelerations, visual odometry provides measures of changes in position. Therefore an IMU drifts over time, while visual odometry provides a result that drifts over distance. IMU's are thus better at fast speeds and visual odometry is good at slow speeds, which are typical for agriculture. Visual odometry cannot measure gravity so is not disturbed by it but likewise cannot use it to find out what is "down" (given by the direction of gravity).

By combining visual odometry with an INS (Inertial navigation system) using GPS, IMU and/or wheel odometry better positioning can be achieved. If GPS becomes unstable or if the signal is lost for short or longer periods of time then an IMU based navigation system will quickly lose track of the position of the vehicle. Likewise relying on wheel odometry to help positioning is hard as it is subject to slip problems (this is especially the case for agricultural vehicles). By combining visual odometry in such a navigation system accurate positioning can be maintained for longer periods of time. It also has the advantage that such a system will have a shorter settling time before it runs stable. Current INSs require a certain amount of driving before they are performing in a stable manner. The overall accuracy is also increased as visual odometry can come with faster position updates than typical GPS. Lastly, at low speeds a navigation system comprising visual odometry will be more accurate as navigation systems based solely on GPS and IMU's tend to perform poorly at these speeds.

According to the present invention, preferably the analysis of the frames comprise establishing distinct features in the frames, establishing 3D information about the distinctive features found in the frames, matching distinct features found in one frame with distinctive features found in a second earlier frame, and establishing a change of pose between said one frame and the second frame on basis of respective positions of matched distinctive features in the two frames. Starting in one frame detecting distinct features and tracking in an earlier frame (to the degree such features are present in the second frame) ensures that as much information as possible is drawn from the former frame.

In case the 3D imaging device is a stereo camera the establishing of 3D information e.g. includes tracking and matching distinct features of the left and right frame and performing triangulation to obtain information of the third dimension. In case the 3D imaging device is based on the time-of-flight principle 3D information will be immediately available.

Preferably the change of pose between said one frame and the second frame is compared to a predetermined change of pose and said one frame is rejected if the change of pose is smaller than said predetermined change of pose. Preferably this step of rejecting is only performed if the method used for evaluating the change of pose provides a sufficiently large percentage of inliers among the matched distinct features. By rejecting frames showing only small changes of pose relative to the preceding frame, the precision of the method is enhanced.

The matching of a distinctive feature found in a second frame with a distinct feature found in said one frame preferably comprises establishing a search area in the second frame within which the distinct feature is suspected to be found based on knowledge of a current movement of the vehicle. In this way the risk of mismatches is minimized, thus enhancing the credibility of the method.

When the vehicle is equipped with further navigation sensors, e.g. an IMU, said knowledge of the current movement of the vehicle is preferably established on basis of information from at least one further navigation sensors. Thus a search area may be established even if the visual odometry should momentarily deliver a poor estimate of the change of pose of the vehicle, and e.g. an IMU, possibly in combination with wheel odometry may deliver an estimate of a change of pose occurring in the time between obtaining two frames.

According to a preferred embodiment information about distinct features in a non-rejected frame is stored, distinct features found in one frame and matched with distinct features in a second frame are tracked further back in the chronological sequence of frames, and changes of pose between different, especially chronologically adjacent, frames, in which such distinctive features are tracked, are taken into account for establishing a change of pose through the chronological sequence. Tracking distinct features found in one frame further back than the immediately preceding frame provides more information and better credibility of the method.

Preferably the distinct features found in one frame and matched with distinct feature in a second image frame are tracked back as far as possible in the chronological sequence of frames. Thus as much information as possible is made available for the method thus further enhancing its performance.

In one embodiment frames in the chronological sequence, in which distinctive features of said one frame are not tracked, are rejected from the chronological sequence. When distinctive features found in the current frame is no longer traceable in an elder frame, this elder frame is no longer necessary and it is therefore rejected from the sequence to save storage. Thereafter an estimate of the current pose of the vehicle is preferably established on basis of the pose of the vehicle at the time of the eldest frame in the chronological sequence, in which distinctive features of said one frame are tracked, and the change of pose between said eldest frame and said one frame. Thus the current pose is established on basis of as much information as possible thus providing a most accurate pose estimate.

In an embodiment where the vehicle comprises a steering angle gauge measuring the angle of steering wheels of the agricultural vehicle, the method further comprises comparing the vehicles change of pose and the angle of the steering wheels. Thus it is possible to determine slip angles of the steering wheels.

In an embodiment where the vehicle comprises a global direction sensing device sensing a global direction of travel of the vehicle, the method further comprises comparing the change of pose of the vehicle with the global direction of travel of the vehicle. Thus it is possible to determine the true heading of the vehicle in global coordinates.

In an embodiment where the vehicle comprises a wheel revolution indicator attached to driving wheels of the vehicle the method further comprises comparing a speed of the vehicle indicated by the revolution indicator with the change of pose of the vehicle. Thus it is possible to detect slip of the driving wheels of the vehicle.

Preferably the change of pose of a specific location on the vehicle is currently established. Thus it is possible currently to establish e.g. the position of the coupling point between a tractor and a hitched implement for a more precise control of said implement.

The present invention also relates to an agricultural vehicle, especially a tractor or an automotive agricultural implement such as a harvester or a baler etc., comprising a 3D imaging device, a computer system comprising an image processing device, at least one navigation sensor selected from a group comprising: a GPS sensor, an inertial measuring unit, a steering angle gauge for measuring the angle of steering wheels of the agricultural vehicle and a wheel revolution indicator, and a computer-readable medium having stored thereon a set of instructions, which when run by the computer system causes the computer system to perform a method of the present invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
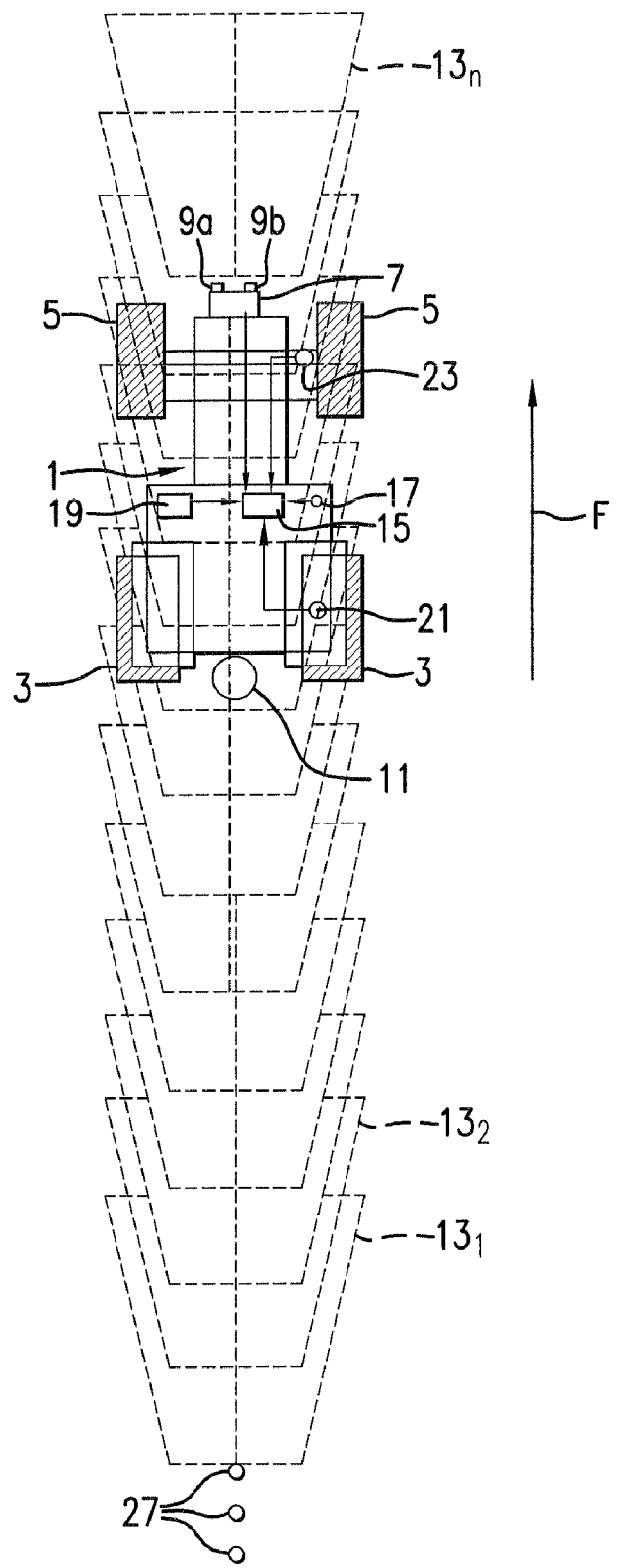
FIG. 1 illustrates a tractor navigating according to the present invention.

FIG. 1 shows a tractor 1 with driving wheels 3 and steering wheels 5. The tractor 1 is at the front equipped with a stereo camera 7 with two objective lenses 9a and 9b. The tractor further has a coupling point 11 for attachment of an implement. Driving in the forward further direction F the stereo camera 7 images areas $13_1, 13_2, \ldots 13_n$ of the surrounding ground in front of the tractor 1. For sake of clarity only a limited number of the imaged areas are shown. The tractor is further provided with a computer 15 for processing the images provided by the stereo camera 7. The computer comprises a memory.

Figure 2:
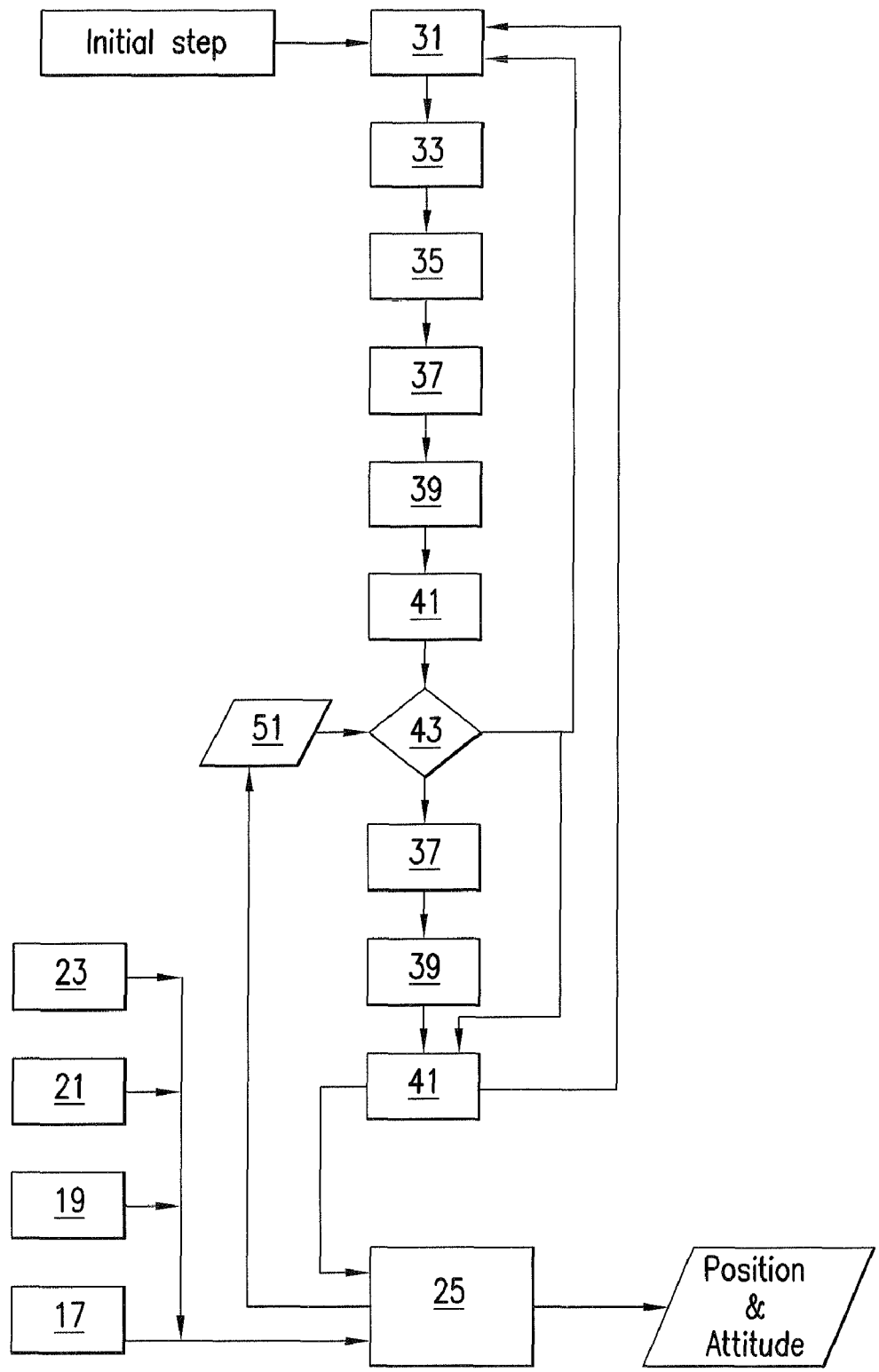
FIG. 2 is a flow chart illustrating a method according to the invention.

The tractor 1 is further equipped with other navigation sensors, namely: a GPS-antenna or GPS-sensor 17, an IMU-sensor 19, and a wheel odometry-sensor comprising a driving wheel encoder 21 and a steering wheel gauge 23. The computer 15 implements a prior art navigation system 25 (FIG. 2) receiving input from these navigation sensors as indicated in FIGS. 1 and 2. The navigation system comprises a Kalman filter.

The stereo camera 7 outputs its images of the areas $13_1, 13_2, \ldots 13_n$ or fields of view in computer readable form generally referred to as frames P. A frame of the stereo camera 7 comprises a left frame and a right frame provided by the left objective lens 9a and the right objective lens 9b, respectively.

On basis of the frames visual odometry is according to the present invention performed in the following way:

Initial Step:

Obtain a first frame comprising left and right frame from the stereo camera 7.

Seek and match distinctive features in first left and right frame.

Project matched distinctive features to 3D using information obtained from the left and the right frame.

Store the frame and the information thus obtained as "key frame".

Referring to FIG. 2 the method hereafter proceeds as follows:

Step 31: Get a new frame comprising left and right frame from stereo camera.

Step 33: Seek distinctive features in left and right frame.

Step 35: Match distinctive features thus found in left and right frame.

Step 37: Project matched distinctive features of left and right frame to 3D.

Step 39: Match distinctive features of the new frame with distinctive features of the latest stored key frame.

Step 41: Estimate the tractor 1's (i.e. the stereo camera 7's) movement, i.e. the change of pose, between new frame and latest key frame;

Step 43:

If the change of pose is small: Export as visual odometry reading the estimated change of pose or the estimated current pose to the navigation system 25, reject the new frame, and return to step 31, If not: Store new frame as new key frame to form a chronological succession of key frames.

Step 45: Track distinctive features of the new key frame, which are matched with distinctive features of latest stored key frame, in every previous key frame in the chronological succession;

Step 47: Reject from the chronological succession of key frames any previous key frame, in which no distinctive feature matching with a distinctive feature of the new key frame is found;

Step 49: Estimate the tractor 1's (i.e. the stereo camera 7's) movement, i.e. the change of pose, between new frame and eldest key frame in the chronological succession of key frames.

The current pose may be established from the pose of the eldest key frame in the chronological succession of key frames and the established transformation.

Export as visual odometry reading the estimated change of pose or the estimated current pose to the navigation system 25.

Return to step 31.

In the navigation system 25 the readings of the navigation sensors 17, 19, 21, 23 and the visual odometry reading from step 43 or step 49 are treated to provide a position estimate.

If instead of a stereo camera a 3D imaging device is based on the time-of-flight principle is used, then the initial step would alternatively be:

Obtain first frame from 3D sensor.

Seek distinctive features in first frame.

Store frame and the information thus obtained as key frame.

Correspondingly Steps 31 to 37 would alternatively be:

Step 31: Get a new frame from 3D sensor.

Step 33: Seek distinctive features in the new frame (proceed to step 39).

Seeking distinctive features in step 33 and the initial step may be performed by any known methods e.g. by any known method of so-called "Blob detection" or any known method of so-called "Corner detection". These methods provide a response for a pixel or small group of pixels centred around a pixel. A pixel having a response, but for which another pixel having a more pronounced response is found in its local neighbourhood, is rejected since weak responses are likely to cause noise.

Matching of distinctive features in step 35, step 39 and the initial step is performed on basis of texture analysis of the vicinity of the respective features. Such analysis is made by means of a so-called "Feature descriptor", of which several are known in the art, e.g. Zero-mean Normal Cross Correlation, the SURF (Speeded Up Robust Features) descriptor and the SIFT (Scale-invariant feature transform) descriptor.

When matching a distinctive feature found in the new frame with a distinctive feature in the latest stored key frame, then the search for a possible match is restricted to an area of the latest stored key frame, where the correct match is expected to be found. This area of expectation is defined on basis of knowledge of the vehicle's movement during the time between the new frame and the latest stored key frame. This knowledge is obtained from the navigation system based on input from the other navigation sensors as indicated by 51 in FIG. 2.

Projecting matched distinctive features of a left and a right frame to 3D in step 37 and the initial step is preferably done by triangulation.

Determining Change of Pose:

The stereo camera 7's, and thus the tractor 1's change of pose during the time between one (key) frame and another (key) frame is described by a trans-formation matrix M:

$$M = \begin{pmatrix} R & T \\ 0 & 0 & 0 & 1 \end{pmatrix}$$

where

R is a 3 by 3 matrix (3 rows and 3 columns) expressing the rotation about three spatial axes, and T is a 3 by 1 matrix defining the translation in three spatial directions;

M is thus a 4 by 4 matrix.

If $P_a$ designates a key frame of a time a and $P_b$ designates a neighbouring (key) frame of a later time b, i.e. a<b, then $P_b = M_{ab} * P_a$, where $M_{ab}$ is a matrix expressing the transformation from a b.

Cf. step 41 mentioned above, M is in an embodiment of the present invention established by a RANSAC method:

If $f_{as}$ is distinctive feature No. s in $P_a$, which have been matched with $f_{bs}$, which is distinctive feature No. s in $P_b$, and correspondingly $f_{at}$ is distinctive feature No. t in $P_a$, which have been matched with $f_{bt}$, which is distinctive feature No. t in $P_b$, and $f_{au}$ is distinctive feature No. u in $P_a$, which have been matched with $f_{bu}$, which is distinctive feature No. u in $P_b$, and if $f_s$, $f_t$ and $f_u$ are non-collinear, then $$f_{bs} = M_{ab}^* f_{as}$$
$$f_{bt} = M_{ab}^* f_{at}, \quad f = \begin{pmatrix} x \\ y, \\ z \end{pmatrix} \text{ where } x, y, z \text{ are the spatial}$$
$$f_{bu} = M_{ab}^* f_{au} \quad 1$$

constitutes an equation system from which $M_{ab}$ can be calculated.

$M_{ab}$ is according to a RANSAC method calculated as estimate a large number of times for randomly selected three matched pairs of distinctive features $f_a$ and $f_b$. Once an estimate of $M_{ab}$ is thus calculated it is tested against the other matched pairs of distinctive features in $P_a$ and $P_b$. Here through a best estimate of $M_{ab}$ is established. Matched pairs of distinctive features, which according to the best estimate of $M_{ab}$ appear to be mis-matches, are rejected as outliers.

Cf. step 43 mentioned above, if the $M_{ab}$ thus established shows that the corresponding movement of the camera/vehicle is small and the percentage of inliers (i.e. matched pairs of distinctive features, which are not rejected as outliers) is considered sufficiently large then the frame $P_b$ is rejected since small movements between frames would increase errors in later calculations.

Cf. step 49 mentioned above, to minimize errors M is currently determined for as long a time span as possible. At a given time n, for which $P_n$ is not rejected, distinctive features $f_n$, which are matched with distinctive features $f_{n-1}$, are tracked further back as far as possible to be matched with corresponding features $f_{n-2}$, $f_{n-3}$, ... $f_{n-m}$ in earlier frames. Estimates of $M_{n-1\ n}$, $M_{n-2\ n}$, ... $M_{n-m\ n}$ is established. In this connection it is utilised that if a<b<c, then $M_{ac} = M_{ab} M_{bc}$.

The estimates of $M_{n-1\ n}$, $M_{n-2\ n}$, ... $M_{n-m\ n}$ is refined by a bundle adjustment e.g. using the Levenberg-Marquardt algorithm to obtain a best estimate of $M_{n-m\ n}$.

In this way M is currently updated using as much information from the past as possible, and the current pose of the camera/vehicle at time n is established or estimated from the pose of the eldest point of time n-m from which information is included in the establishment of the current M (i.e. $M_{n-m\ n}$).

Examples of Use:

Referring to FIG. 1 the tractor 1 is driving along a row of plants 27. An implement not shown may be hitched at the coupling point 11 to perform a treatment of the row of plants 27. Due to the visual odometry providing with high accuracy the position and attitude of the stereo camera 7 it is possible, in accordance with the present invention, to calculate the position of the hitching point 11 with a correspondingly high accuracy, and thus it is possible to position with high accuracy the implement in relation to the row of plants 27. The visual odometry will provide better accuracy than inertial odometry using an IMU because visual odometry in general perform better at the relatively low speed at which fieldwork is performed in agriculture, and visual odometry is not subject to gyro-drift like an IMU.

When pulling e.g. a ground-engaging implement such as a cultivator, a plough or a harrow wheel slip of the driving wheels 3 may indicate that the implement is to deep in the ground. Due to the fact that visual odometry provides a fast update rate an early warning of such wheel slip may be provided in case of an indication of larger velocity from the driving wheel encoder 21 than from the visual odometry.

Figure 3:
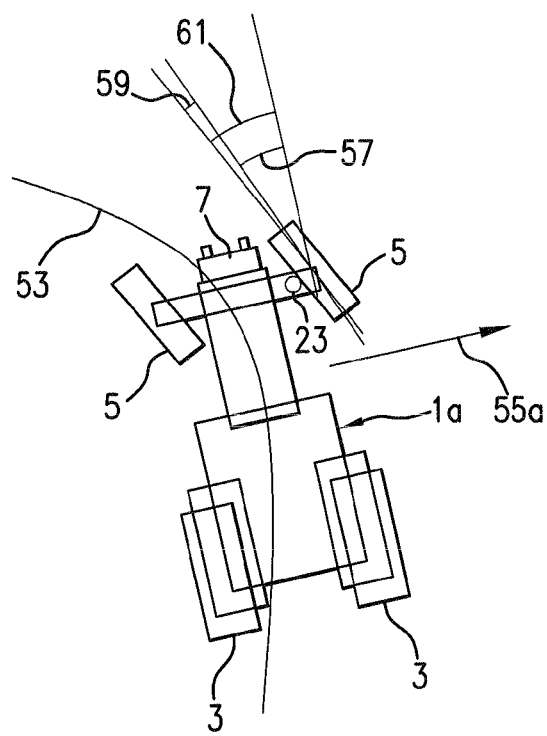
FIG. 3 shows a tractor driving through a curve according to the invention.
Figure 4:
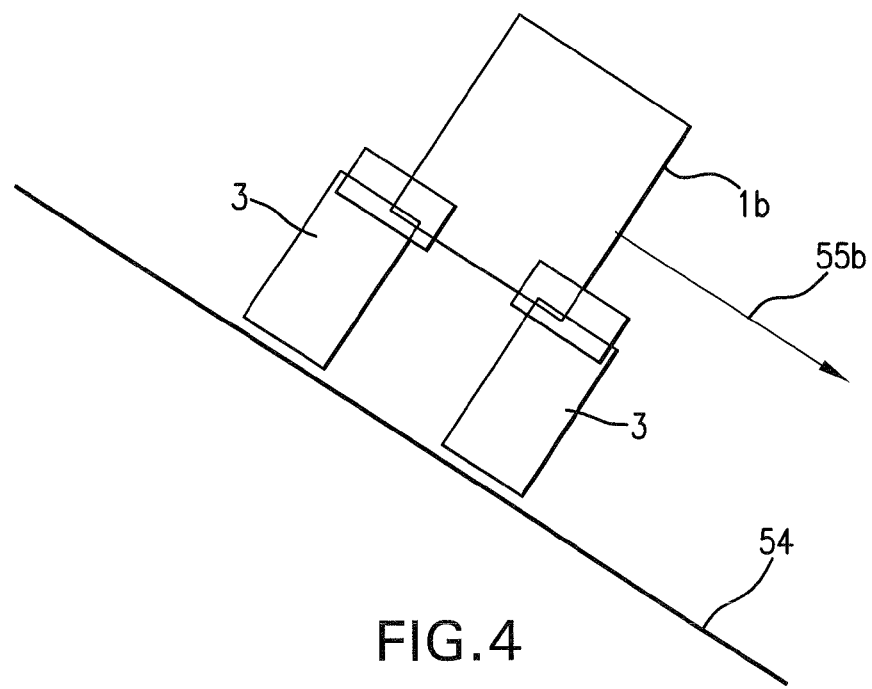
FIG. 4 shows a tractor driving on a slope according to the invention.

Referring to FIGS. 3 and 4 visual odometry may be used to solve the problem of wheel-slip or tire-slip of the steering wheels 5. FIG. 3 as well as FIG. 4 shows a tractor 1a and 1b, respectively, subject to a slip-producing side force 55a and 55b, respectively. In FIG. 3 the side force 55a is a centrifugal force due to the tractor 1a driving through a curve 53, and in FIG. 4 the side force 55b is due to gravity as the tractor 1b is driving on a sloping surface 54.

Tire-slip is a general problem for auto-steering systems. It depends on many factors and the forces involved cannot directly be measured. Research has shown (state-of-the-art) that a feasible solution is to estimate the tire-slip parameters based on the true ground velocity (with possible noise). Current solutions attempt to do this using GPS sensors and/or INS. If the slip angles can be estimated they can be accommodated for in the controller (this gives a higher accuracy). The estimate of change of pose provided by visual odometry reflects the true course 57 over the ground relative to the vehicle (tractor 1). The slip angle 59 is then the difference between the true course 57 and the current steering wheel angle 61, which is measured by means of the steering wheel gauge 23.

Figure 5:
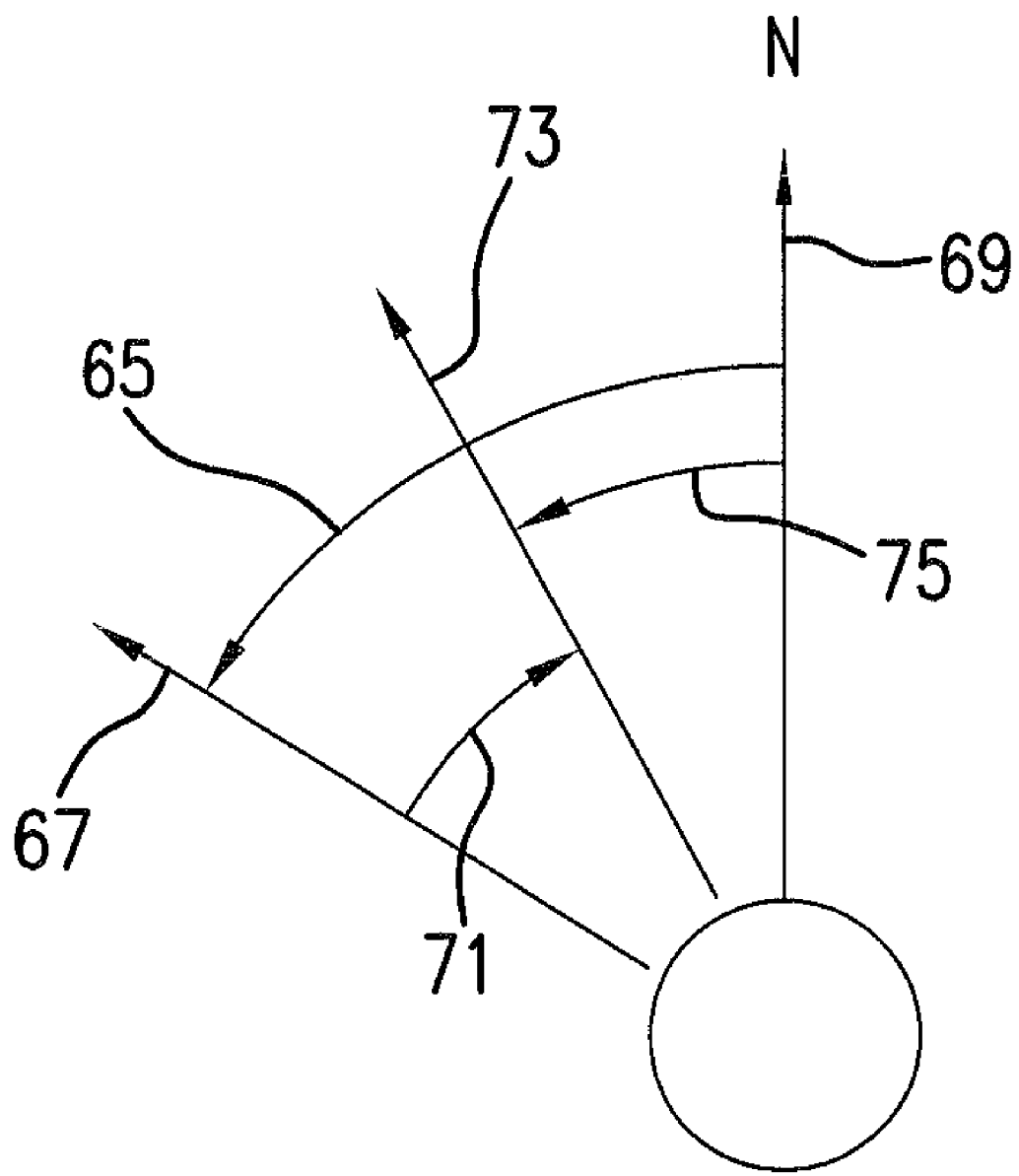
FIG. 5 illustrates estimation of the true heading of a vehicle according to the invention.

Referring to FIG. 5 visual odometry is used together with GPS to estimate the true global heading of a vehicle (tractor) or the true heading of the vehicle in global coordinates, i.e. the true angle 65 of the direction 67, in which the vehicle is heading, from the direction North 69. As mentioned above visual odometry provides an indication of the true course over the ground (or direction of travel) relative to the tractor, i.e. visual odometry provides an indication of the angle 71 of the direction 73 of the course over the ground from the direction 67, in which the vehicle is heading. The direction 73 of the course over the ground may due to tire-slip, e.g. in case of a tractor driving on a sloping surface as shown in FIG. 4, deviate from the direction the tractor is heading, even if the tractor is actually driving along a straight line. The global course, i.e. the angle 75 of the direction 73 of the course over the ground from the direction North 69 is established by means of the GPS.

The true global heading or true North heading angle, i.e. angle 65 as indicated in FIG. 5, can now be calculated as angle 75 minus angle 71.

It will be understood that each of the elements described above, or two or more together, may also find a useful application in other types of methods and constructions differing from the types described above.

While the invention has been illustrated and described as embodied in a method of navigating an agricultural vehicle, and an agricultural vehicle implementing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of navigating an agricultural vehicle, comprising the steps of:
   equipping the vehicle with a 3D imaging device for imaging surroundings of the vehicle, and with an image processing device;
   obtaining from the 3D imaging device frames imaging at least a part of the surrounding of the vehicle at different points of time while the vehicle is moving thus providing a chronological sequence of frames;
   analyzing the frames;
   establishing a change of pose of the vehicle using results of the analysis of at least two chronologically different frames;
   estimating a slip angle, wherein the vehicle comprises a steering angle gauge for measuring an angle of steering wheels of the agricultural vehicle; and
   comparing a change of pose and the angle of the steering wheels of the agricultural vehicle.

2. The method as defined in claim 1, further comprising equipping the vehicle with at least one further navigation sensor; and using a response from the at least one further navigation sensor when establishing the change of pose.

3. The method as defined in claim 2, further comprising selecting the at least one further navigation sensor from a group consisting of a GPS sensor, an inertial measuring unit, a steering angle gauge indicating an angle of steering wheels of the agricultural vehicle, and a wheel revolution indicator.

4. The method of defined in claim 1, further comprising performing in the analysis of the frames establishing of distinct features in the frames, establishing of 3D information about the distinctive features found in the frames, matching distinct features found in one frame with distinct features found in a second earlier frame; establishing a change of pose between the one frame and the second frame on basis of respective positions of matched distinctive features in the two frames.

5. The method as defined in claim 4, further comprising comparing the change of pose to a predetermined change of pose, and rejecting the one frame if the change of pose is smaller than the predetermined change of pose.

6. The method as defined in claim 4, further comprising, in the matching of a distinctive feature found in a second frame with a distinct feature found in the one frame, including establishing a search area in the second frame within which the distinct feature is suspected to be found based on knowledge of a current movement of the vehicle.

7. The method as defined in claim 6, further comprising providing the establishing of the knowledge of the current movement of the vehicle on basis of information from at least one further navigation sensor.

8. The method as defined in claim 4, further comprising tracking information about distinct features in a non-rejected frame in stored, distinct features found in one frame and matched with distinct features in a second frame, back in a chronological sequence of frames; and taking into account changes of pose between different frames, in which such distinctive features are tracked, for establishing a change of pose through the chronological sequence.

9. The method as defined in claim 8, wherein said tracking the changes of pose includes tracking the changes of pose between different, chronologically adjacent frames.

10. The method as defined in claim 8, further comprising tracking back the distinct features found in one frame and matched with distinct features in a second image frame as far as possible in the chronological sequence of frames.

11. The method as defined in claim 8, further comprising rejecting from the chronologic sequence frames in the chronological sequence, in which distinctive features of the one frame are not tracked.

12. The method as defined in claim 8, further comprising establishing an estimate of a current pose of the vehicle on basis of a pose of the vehicle at the time of eldest frame in the chronological sequence in which distinctive features of the one frame are tracked and the change of pose between the eldest frame and the one frame.

13. The method as defined in claim 1, further comprising sensing a global direction of travel of the vehicle by a global direction sensing device provided in the vehicle; and comparing the change of pose of the vehicle with the global direction of travel of the vehicle.

14. The method as defined in claim 1, further comprising comparing a speed of the vehicle indicated by a wheel revolution indicator attached to driving wheels of the vehicle, with the change of pose of the vehicle.

15. The method as defined in claim 1, further comprising currently establishing the change of pose of a specific location on the vehicle.

16. An agricultural vehicle, comprising a 3D imaging device; a computer system including an image processing device; at least one navigation sensor; and a computer-readable medium having stored thereon a set of instructions, which when run by a computer system causes the computer system to perform the method of claim 1.

17. An agricultural vehicle as defined in claim 16, wherein said at least one navigation sensor is a sensor selected from the group consisting of a GPS sensor, an internal measuring unit, a steering angle gauge for measuring an angle of steering wheels of the agricultural vehicle, and the wheel revolution indicator.

18. The method as defined in claim 1, wherein the agricultural vehicle is the vehicle selected from the group consisting of a tractor and an automotive agricultural implement.

19. The method as defined in claim 18, wherein said automotive agricultural implement is an implement selected from a group consisting of a harvester and a baler.

* * * * *